July 21, 1953  R. T. SPEDDING  2,645,890
EXTENSION LINK FOR MOWERS
Filed Oct. 28, 1950  2 Sheets-Sheet 1

INVENTOR.
RAYMOND T. SPEDDING
BY
*W. D. Schaich*
ATTORNEY

July 21, 1953 — R. T. SPEDDING — 2,645,890
EXTENSION LINK FOR MOWERS
Filed Oct. 28, 1950 — 2 Sheets-Sheet 2
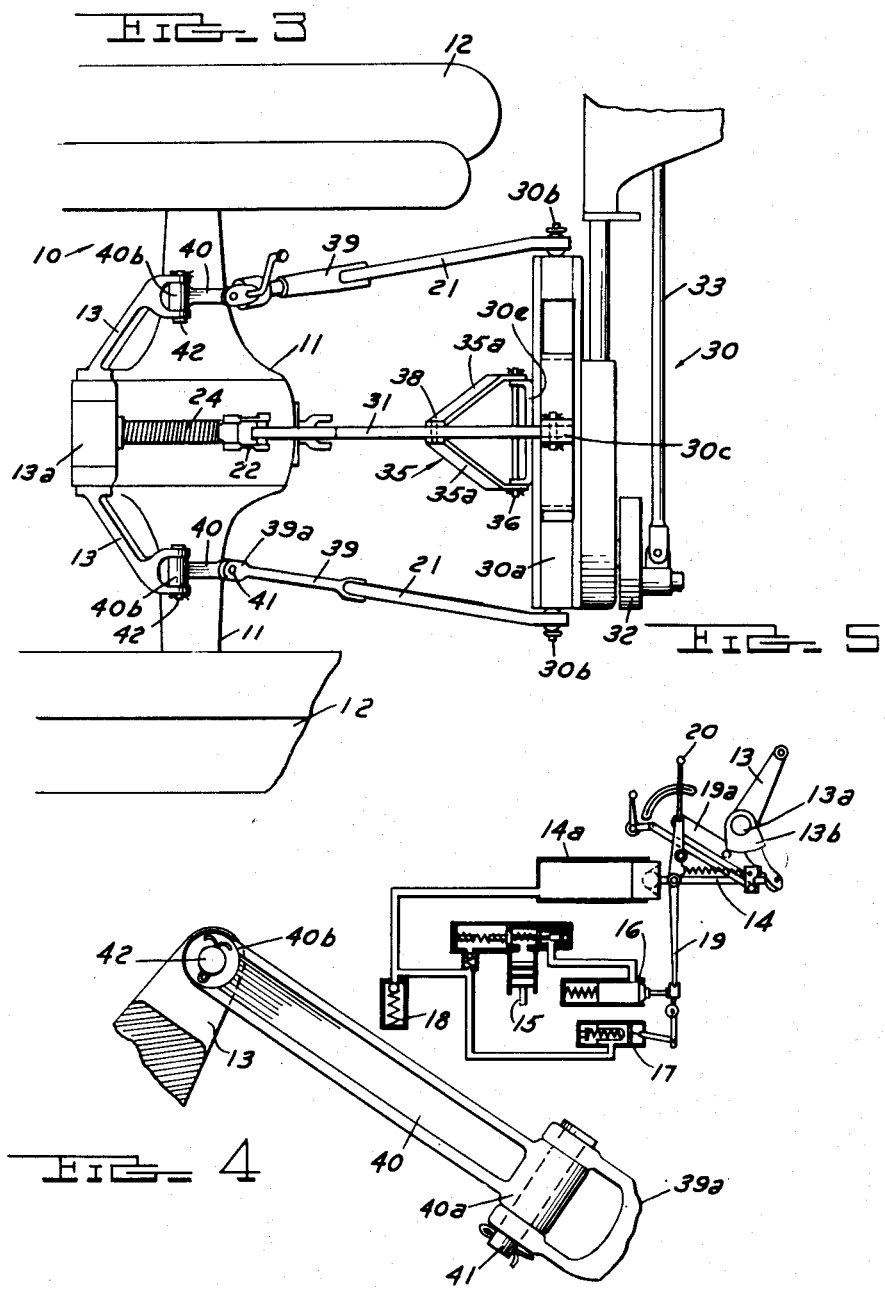
INVENTOR.
RAYMOND T. SPEDDING
BY
ATTORNEY

Patented July 21, 1953

2,645,890

UNITED STATES PATENT OFFICE

2,645,890

EXTENSION LINK FOR MOWERS

Raymond T. Spedding, Detroit, Mich., assignor to Dearborn Motors Corporation, Birmingham, Mich., a corporation of Delaware Application October 28, 1950, Serial No. 192,797

1 Claim. (Cl. 56—25)

This invention relates to an improved hitch for connecting power-take-off driven implements to a tractor, and particularly to a hitch arrangement for connecting a rear attached mower to a tractor of the type having power-lifted, trailing draft links.

Rear attached mowers have been widely used on all types of tractors and particularly with tractors having transversely spaced, power-lifted, trailing hitch links, and a rear central power-take-off shaft. It happens, however, that the hydraulic mechanism utilized for controlling the vertical position of such hitch links has the characteristic of producing angular movement of the hitch links through a definite limited range and, when a lift type implement is to be transported in a raised position on such hitch links, it is necessary that the hydraulic mechanism be actuated to raise the hitch links to the top position of their range of movement. It is, of course, desirable that any form of lift type implement be mounted in as closely coupled relationship to the rear of the tractor as is physically possible. Hence, in the case of power-take-off driven implements, the distance between the input shaft on the implements and the power-take-off shaft on the tractor is maintained relatively short, and the two shafts must necessarily be interconnected, by a universally jointed, extensible shaft arrangement so as to accommodate the vertical movement of the implement produced by the hitch links. With such short distance available for the extensible shaft, excessive angular displacements of the ends of the extensible shaft are achieved whenever the implement is moved throughout the whole range of vertical movement conventionally provided by the hydraulically lifted hitch links. If the upward movement of the hitch links is arbitrarily limited in some fashion so as to prevent the excessive angular displacement of the extensible shaft, it necessarily means that the implement must be transported with the hitch links and the hydraulic mechanism disposed in an intermediate position in their range of vertical movement and, unless the operator carefully adjusts the manual control lever for the hydraulic mechanism he will more often than not adjust such control lever to a sufficient height that the hydraulic mechanism is attempting to raise the hitch links to a point beyond that permitted by the limiting arrangement, with the result that the entire apparatus is put under excessive strain and, generally, the relief valve in the hydraulic system is opened to relieve the excessive pressure developed in such system.

Accordingly, it is an object of this invention to provide an improved hitch arrangement for connecting a power-take-off driven, lift type implement to the hydraulically lifted hitch links of a tractor, and characterized by the fact that the total range of lifting movement of the implement is positively limited so as to avoid excessive misalignment of the input power shaft of the implement with the power-take-off shaft of the tractor, and at the same time, the hydraulic mechanism on the tractor is permitted to move to the uppermost position of its standard range of movement.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Fig. 3 is a partial plan view of the device of Fig. 1.

Fig. 4 is an enlarged scale, elevational, detail view of the link connection between the rocker arms and the hitch links.

Fig. 5 is a schematic diagram of the hydraulic mechanism commonly provided in a well known type of tractor.

As shown on the drawings:

Figure 1:
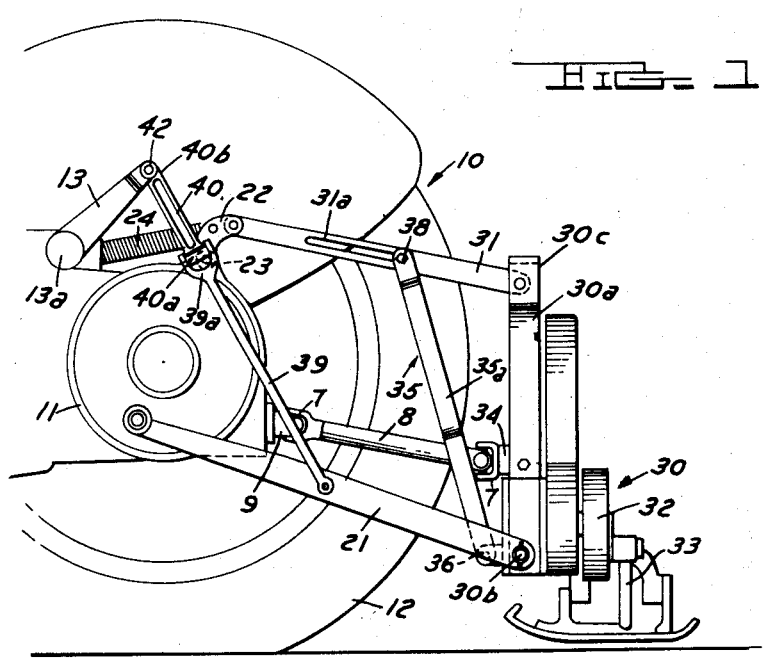
Fig. 1 is a side elevational view of the rear portion of the tractor, showing a hitch constructed in accordance with this invention utilized for connecting a mower to such tractor, the mower being shown in its ground engaging position.

The numeral 10 represents a well known form of tractor having a rear axle housing 11 supported by rear wheels 12. At the top central portion of the rear axle housing 11, a pair of transversely spaced rocker arms 13 are provided, being mounted on a common shaft 13a. Rocker arms 13 form part of a hydraulic mechanism conventionally provided on this type of tractor and which has been schematically illustrated in Fig. 5. Such hydraulic mechanism is a well known construction and will not be described in detail beyond pointing out that it embodies a hydraulically operated ram 14 which is operatively connected to the cross shaft 13a for angularly shifting the rock arms 13 through a predetermined range of movement. Hydraulic fluid is supplied to the ram cylinder 14a by a pump 15, which is in turn controlled by a valve 16 connected to the inlet side of such pump. The exhaust of hydraulic fluid from ram cylinder 14a is controlled by an exhaust valve 17. A pressure relief valve 18 is provided in the conduit supplying the ram cylinder 14a. The settings of inlet valve 16 and exhaust valve 17 are controlled by a linkage arrangement 19 which is operatively connected to a manually operated lever 20. As the lever 20 is raised, the inlet valve 16 is opened and the exhaust valve 17 is closed so that a pressured fluid is supplied to ram cylinder 14a to produce an outward movement of the ram 14 and thus produce a raising movement of the rock arms 13. Linkage 19 is operatively connected to the rock shaft 13a by linkage 19a and cam 13b so as to be influenced by the angular movement of the rock shaft and to assume a neutral position when the rock arms 13 have been shifted to correspond to the selected position of the manual control lever 20. It necessarily follows that when the manual control lever 20 is shifted to its uppermost position, the hydraulic mechanism inherently reacts to attempt to shift the rock arms 13 to their uppermost positions. Since this portion of the hydraulic mechanism is entirely conventional and forms no part of the invention, further detailed description thereof is believed unnecessary.

At transversely spaced points on the rear axle housing 11, a pair of trailing draft links 21 are pivotally mounted. Also, at the top central portion of the rear axle housing 11, a top link pivotal connection is provided in the form of a rocker 22 which is pivotally connected to the rear axle housing as at 23 and bears against a draft control spring 24. These elements are likewise entirely conventional.

This invention finds particular applicability in connection with effecting the mounting of power-take-off powered implements to the tractor 10. The problem is particularly acute in connection with rear attached mowers and a typical rear attached mower 30 has been shown on the drawings. The frame structure 30a of such mower is provided with laterally spaced pivot pins 30b near its lower extremities which are respectively pivotally connected to the free ends of the hitch links 21, while the top portions of the frame structure define a bifurcated bracket 30c for pivotal connection to the rear end of a top link 31 which has its front end pivotally connected to the rocker 22. Mower 30 of this invention embodies a reciprocating cutter bar (not shown) which is driven by a rotary crank 32 and pitman 33. Power is supplied to rotary crank 32 in any conventional fashion from an input shaft 34 which is centrally disposed in the mower frame 30a. Connection of input shaft 34 to the power-take-off shaft 9 of the tractor is effected by a conventional extensible shaft 8 having universal joints 7 at each end thereof respectively connected to power-take-off shaft 9 and mower input shaft 34.

Figure 2:
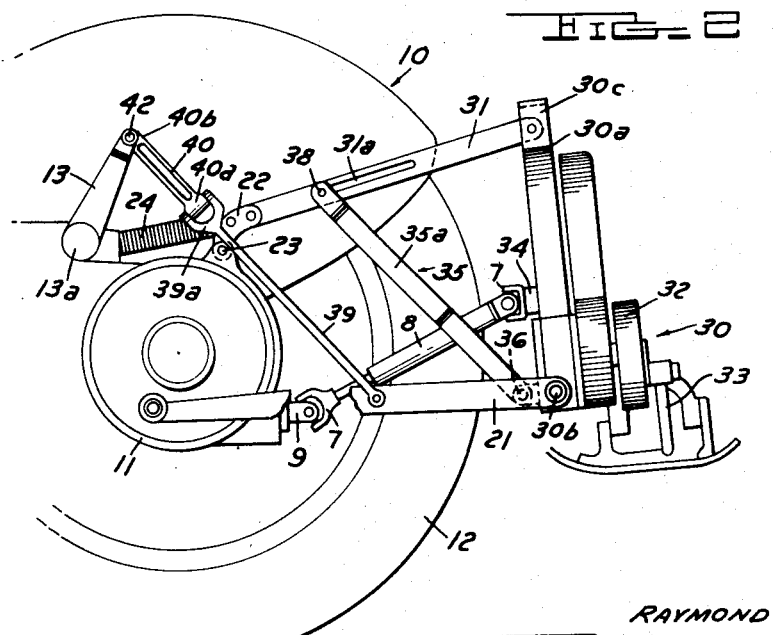
Fig. 2 is a view similar to Fig. 1, showing the mower in its raised transport position.

From the foregoing description, it is apparent that as the hitch links 21 are raised or lowered, a substantial degree of vertical misalignment of input shaft 34 relative to power-take-off shaft 9 will be produced. As is well known, universal joints 7 are only effective up to a certain degree of angular displacement and are subject to excessive vibration and wear whenever power is transmitted by such joints at an excessive displacement angle. Accordingly, in order to limit the maximum transmission angle of the universal joints 7, a limit linkage 35 is provided which may conveniently comprise a pair of laterally spaced bars 35a having their lower ends respectively pivotally attached to a pin 36 which traverses a forwardly projecting bracket 30e provided on the lower front end of mower frame 30a. The top portions of arms 35a respectively lie adjacent opposite sides of top link 31 and a pin 38 connects such top portions and traverses an elongated slot 31a formed on the top link 31. Obviously, as hitch links 21 are raised and lowered, the pin 38 will move along the length of the top link slot 31a. The length of such slot is proportioned so that the pin 38 will engage the rear wall of the slot 31a when the mower 30 is substantially lowered to its ground engaging or working position. The location of the other end of the slot 31a is determined by the maximum angular deviation that is desired for the universal joints 7, and is preferably located so that the mower cannot be raised to a position producing an excessive angular deviation of the universal joints 7 as illustrated in Fig. 2.

The vertical movement of hitch links 21 is, of course, controlled by the rocker arms 13. A link connection 39 is provided between each of the rocker arms 13 and a medial portion of the hitch links 21. In accordance with this invention, however, such link connection 39 has its length substantially increased over the length of the link conventionally provided. In fact, link 39 may be conveniently formed by connection of the conventional link 39 to the end of an extension link 40. Extension link 40 has a suitable pivot bearing hub 40a formed on one end thereof to receive a transverse pin 41 to connect it to the bifurcated end 39a of the conventional link 39, while the other end of extension link 40 has a bearing hub 40b formed thereon which is traversed by a pin 42 to connect it to the respective rocker arm 13. The over-all length of the connecting link 39 is carefully proportioned so that the rocker arms 13 can raise to their maximum height position as determined by the maximum movement of the ram 14 of the hydraulic mechanism, concurrently with the hitch links 21 arriving at the maximum height position permitted by the limiting linkage 35.

It is therefore clear that a hitch construction embodying this invention will positively eliminate any danger of damage or excessive wear to the driving connections between the tractor and the implement caused by excessive vertical displacement of the implement relative to the tractor. At the same time, the described hitch arrangement will permit the hydraulic mechanism to function in conventional fashion and the hydraulic ram to complete its maximum stroke corresponding to the operator's setting of the manual control lever without incurring the possibility of the normal action of the hydraulic mechanism being blocked and excessive pressures being developed in such mechanism.

It will, of course, be understood that various details of construction may be varied through a wide range without departing from the principles of this invention and it is, therefore, not the purpose to limit the patent granted hereon otherwise than necessitated by the scope of the appended claim.

I claim:

In combination with a tractor and a power-take-off powered implement, said tractor having a pair of power-actuated rock arms movable through a fixed arcuate path of predetermined range, a pair of trailing lower draft links pivoted to the tractor, a pair of link arms respectively connected to said draft links and adapted for normal connection to said rock arms to power-lift said draft links through an arcuate range determined by the range of movement of said rock arms, and power-take-off shaft located centrally and rearwardly of said tractor, said implement being pivotally connected to the free trailing ends of said draft links, and universally jointed extensible shaft means connecting said tractor power-take-off shaft and said implement; the improvements which comprise lift arm extension elements interposed between and joining said lift arms and said rock arms to decrease the normal height to which said draft links would be elevated upon power lifting of said rock arms to the highest extent of rock arm movement, a top link joining said tractor to said implement, said top link being located intermediate and above said draft links, a limit arm pivoted to said implement and projecting therefrom, and means joining said limit arm to said top link for relative lost motion movement upon elevation of said draft links, said means being fixedly engageable with said top link when said implement is lowered through less than the full range of movement of said lower links to prevent further lowering of said implement, whereby said extension elements and said last named means, in combination, are effective to limit movement of said implement relative to said tractor so that the angular displacement of said extensible shaft means is maintained within desired operating limits while accommodating elevation of said rock arms to the upper limits of movement thereof.

RAYMOND T. SPEDDING.

References Cited in the file of this patent

UNITED STATES PATENTS

| Number | Name | Date |
|---|---|---|
| 2,223,002 | Ferguson | Nov. 26, 1940 |
| 2,309,750 | Carrington | Feb. 2, 1943 |
| 2,410,508 | Lamme | Nov. 5, 1946 |
| 2,414,072 | Taft | Jan. 7, 1947 |
| 2,462,588 | Wondra | Feb. 22, 1949 |